UNITED STATES PATENT OFFICE.

MILTON McWHORTER, OF SAN FRANCISCO, CALIFORNIA, ASSIGNOR OF SEVEN-TENTHS TO JAMES UHLER HASTINGS, EDWARD McGARY, AND USHER L. DAVIES, OF SAN FRANCISCO, CALIFORNIA.

TIRE-REPAIRING COMPOUND AND PROCESS OF PREPARING SAME.

SPECIFICATION forming part of Letters Patent No. 716,083, dated December 16, 1902.

Application filed May 26, 1902. Serial No. 109,077. (No specimens.)

*To all whom it may concern:*

Be it known that I, MILTON McWHORTER, a citizen of the United States, residing in the city and county of San Francisco, State of California, have invented a certain new and useful Tire-Repairing Compound and Process of Preparing Same; and I do hereby declare the following to be a full, clear, and exact description of the same.

My invention relates to that class of compounds or compositions of matter which are used for repairing punctures in pneumatic vehicle-tires by being inserted or injected into the cavity of the tire, there to remain in fluid state ready to "heal" or render tight any puncture by entering the same from within. The prerequisites of such compound must necessarily be fluidity and adhesiveness, together with an absence of any tendency to injure the tire in which it is confined for use as required.

The object of my invention is to provide a compound of this nature which will indefinitely remain fluid, will enter and hold together the walls of a puncture by what may be termed a "viscous adhesiveness," and which will not dissolve, corrode, or otherwise injure the material of the tire.

With this end in view my invention consists both in the compound itself and in the process of preparing it, which I shall now describe.

The ingredients of my compound and the proportions, substantially, in which they are combined are: asphaltic petroleum, one hundred gallons; crude rubber, two pounds; essential oil of sassafras, six ounces. In preparing this compound I first take asphaltic petroleum and slowly distil off all volatile matters below 350° Fahrenheit until a residue is left which will give off no volatile substances below that degree. The reason for this is that substances which will volatilize off below 350° Fahrenheit are active solvents of rubber. By removing these I have left a residue which will not injure the pneumatic tire. I then thoroughly dissolve two pounds of crude rubber in bisulfid of carbon, using as little of the solvent as may be required. Then with one hundred gallons of the residue of asphaltic petroleum prepared as above I thoroughly mix the crude-rubber solution. Then I place the mixture in a still and distil off all the bisulfid of carbon. There is then a remainder of asphaltic petroleum and rubber, which is thoroughly dissolved, the one ingredient in the other, for the bisulfid of carbon is a solvent for both, and this remainder contains nothing which will injure the tire, for, as before explained, the solvents of rubber which were in the asphaltic petroleum have been driven off and the solvent bisulfid of carbon has by the second distillation been removed. This remainder is now cooled to 60° Fahrenheit, and to it is then added six fluid ounces of the essential oil of sassafras, the effect of which is to preserve the fluidity of the compound by preventing the oxidation of the petroleum, which latter, thus remaining fluid, continues to hold the rubber in solution.

The compound is a thick viscous fluid mass having about the consistency of thick molasses. It is used by injecting a sufficient quantity into the interior of the tire through its valve. In the tire it flows throughout the cavity, coating the inner surface, and is always in readiness to enter from the inside any puncture and by its viscous adhesiveness to hold the walls of the puncture together with sufficient force to prevent the air from escaping. It will remain fluid indefinitely and will not injure the tire.

Having thus described my invention, what I claim as new, and desire to secure by Letters Patent, is—

1. A tire-repairing compound consisting of a residue derived by distilling asphaltic petroleum below 350° Fahrenheit, of crude rubber and essential oil of sassafras substantially as herein described.

2. The process of preparing a composition of matter for use in repairing pneumatic vehicle-tires which consists first, in distilling off from asphaltic petroleum all substances volatilizing below 350° Fahrenheit; second, in dissolving crude rubber in bisulfid of carbon; third, in mixing said rubber solution with the said residue of asphaltic petroleum; fourth in distilling off from the mixture the bisulfid of carbon, and finally in adding to the mixture after the bisulfid of carbon has been driven off, the essential oil of sassafras, substantially as described.

In witness whereof I have hereunto set my hand.

MILTON McWHORTER.

Witnesses:
WALTER F. VANE,
D. B. RICHARDS.